United States Patent
Sreedharan et al.

(10) Patent No.: US 9,348,878 B2
(45) Date of Patent: May 24, 2016

(54) ITERATIVE APPROACH TO DETECT OUTLIERS

(71) Applicant: SAP SE, Walldorf (DE)

(72) Inventors: Unmesh Sreedharan, Walldorf (DE);
Ajay Kumar Gupta, Walldorf (DE);
John MacGregor, Walldorf (DE);
Chandrashekar Vasudevan, Walldorf (DE)

(73) Assignee: SAP SE, Walldorf (DE)

( * ) Notice: Subject to any disclaimer, the term of this patent is extended or adjusted under 35 U.S.C. 154(b) by 410 days.

(21) Appl. No.: 14/107,561

(22) Filed: Dec. 16, 2013

(65) Prior Publication Data
US 2015/0169706 A1    Jun. 18, 2015

(51) Int. Cl.
*G06F 17/30* (2006.01)

(52) U.S. Cl.
CPC ............................... *G06F 17/30554* (2013.01)

(58) Field of Classification Search
CPC combination set(s) only.
See application file for complete search history.

(56) References Cited

U.S. PATENT DOCUMENTS

2015/0286707 A1*  10/2015  Levitan ............. G06F 17/30598
                                                           707/737

* cited by examiner

*Primary Examiner* — Etienne Leroux
(74) *Attorney, Agent, or Firm* — Dilworth IP LLC

(57) ABSTRACT

An iterative approach to detect outliers may automatically detect outliers in a data set. The iterative approach may include calculating a mean and an average deviation for a list. The iterative approach may further include calculating the deviations of values of a list if the average deviation is not zero. Any values where the calculated deviation of the point or value is greater than the mean may be selected. The selected points may be set as a second list. The second list may be used by the iterative approach until no points are selected for the second list. The previous list is the set of outliers from the data set.

20 Claims, 5 Drawing Sheets

ITERATIVE APPROACH TO DETECT OUTLIERS

BACKGROUND

Entities, such as businesses, may utilize backend systems to store big data. Such data may be used, in some instances, for analysis and/or reporting for the entity about the performance of the entity. In some instances, an analysis of such data may be performed to determine outliers in a data set. Outlier detection may be adapted for a specific application, such as eliminating outliers in sales data, in census data (e.g., human census data, wildlife census data, etc), or other applications where outlier detection may be useful.

A K-Nearest Neighbor algorithm ("KNN") is a classification algorithm used for grouping points or values under consideration using the k nearest neighbors based on the Euclidean distance between the point or value and the neighbor, where k determines the number of nearest neighbors to be considered for the calculation.

SUMMARY

One embodiment of the invention relates to a method for iteratively detecting outliers. The method may include receiving a data set having a plurality of values. For each value of the plurality of values in the data set, the method includes calculating a set of Euclidean distances of each value to a predetermined number of other nearest values of the plurality of values in the data set and calculating an average distance of each value based on the set of Euclidean distances. The method further includes generating a first list based on the plurality of values and the average distance for each value of the plurality of values, and sorting the generated first list based on the average distance for each value. The method may also include calculating a first mean of the generated first list and a first average deviation of the generated first list, and calculating, for each value of the first list, a first deviation from the calculated first mean. The method still further includes determining a set of values having a calculated first deviation greater than the calculated first mean, and generating a second list based on the determined set and the average distance for each value of the determined set. The method includes calculating a second mean of the generated second list and a second average deviation of the generated second list, and calculating, for each value of generated second list, a second deviation from the calculated second mean. The method also includes determining a set of values of the plurality of values of the data set as a set of outliers based on the second list, the calculated second mean, and the calculated second deviation for each value of the generated second list.

In another implementation, a system includes one or more processors and a non-transitory computer-readable storage device storing instructions that, when executed by the one or more processors, cause the one or more processors to perform several operations. The operations include receiving a data set having a plurality of values and, for each value of the plurality of values in the data set, calculating a set of Euclidean distances of each value to a predetermined number of other nearest values of the plurality of values in the data set and calculating an average distance based on the set of Euclidean distances. The operations also include determining a set of values of the plurality of values of the data set as a set of outliers. The determination of the set of values as a set of outliers includes generating a list based on the plurality of values and the average distance for each value of the plurality of values. The determination also includes calculating a mean of the generated list and an average deviation of the generated list, and, for each value of the list, calculating a deviation from the calculated mean. The determination further includes determining if a deviation is greater than the calculated mean and, if a deviation is greater than the calculated mean, determining a set of values having a calculated deviation greater than the calculated mean and setting the set of values as the list. If a deviation is not greater than the calculated mean, then the determination may include setting the list as the set of outliers.

In yet a further implementation, a non-transitory computer-readable storage device may store instructions that, when executed by one or more processors, cause the one or more processors to perform several operations. The operations may include receiving a data set having a plurality of values. For each value of the plurality of values in the data set, the operations may include calculating a set of Euclidean distances of each value to a predetermined number of other nearest values of the plurality of values in the data set and calculating an average distance based on the set of Euclidean distances. The operations further include generating a first list based on the plurality of values and the average distance for each value, and calculating a first mean of the generated first list and a first average deviation of the generated first list. The operations still further include determining if the first average deviation is equal to zero and, if the first average deviation is equal to zero, setting the first list as a set of outliers. If the first average deviation is not equal to zero, then the operations may include calculating, for each value of the first list, a first deviation from the calculated first mean and determining if a first deviation is greater than the calculated first mean. If a first deviation is greater than the calculated first mean, then the operations may include determining a set of values having a calculated first deviation greater than the calculated first mean and generating a second list based on the determined set and the average distance for each value of the determined set. If a first deviation is not greater than the calculated first mean, then the operations include setting the first list as the set of outliers.

BRIEF DESCRIPTION OF THE DRAWINGS

Various embodiments taught herein are illustrated by way of example, and not by way of limitation, in the figures of the accompanying drawings, in which.

Figure 1:
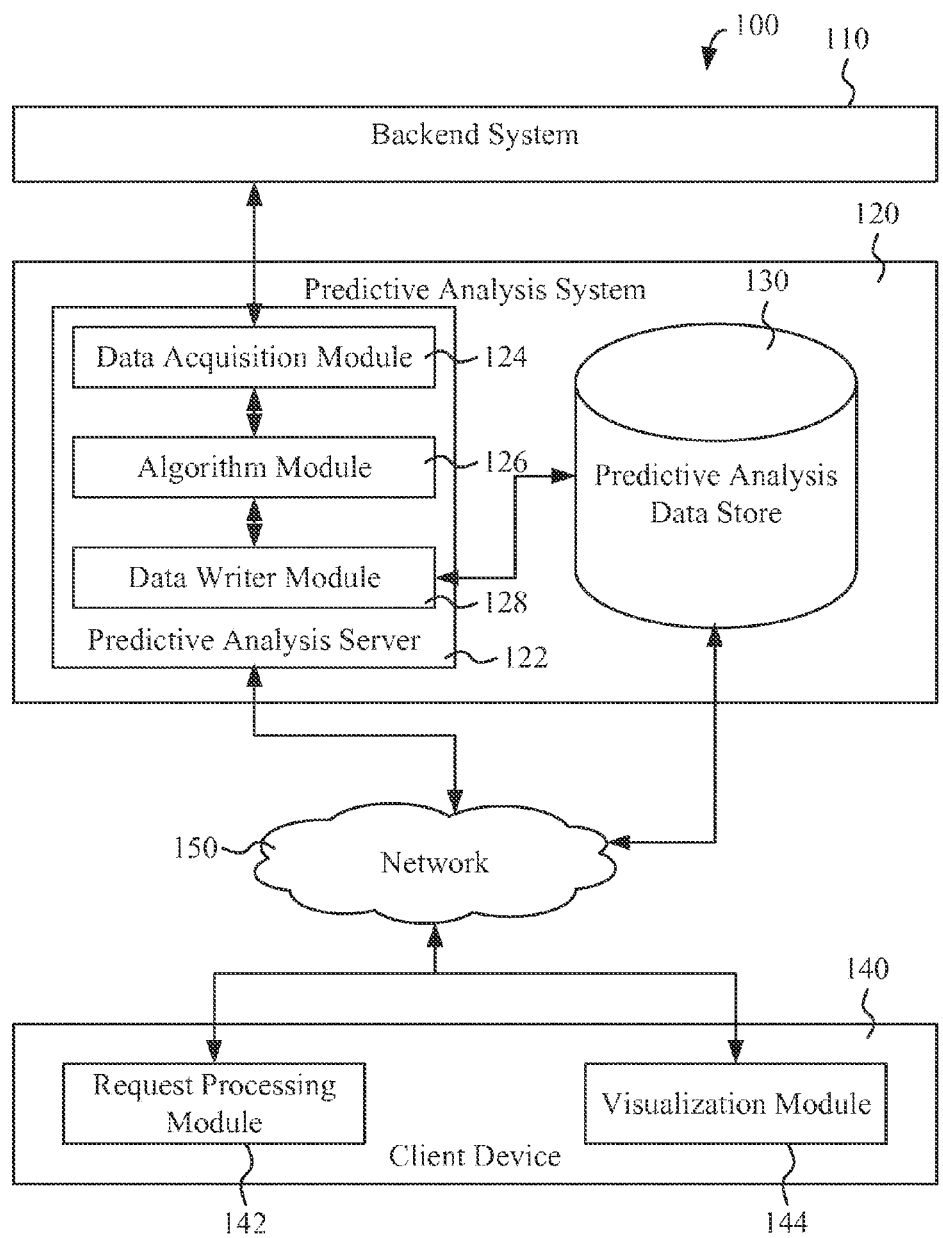
FIG. 1 is an overview block diagram of an example system for predictive analysis that may utilize an iterative approach to automatically detect outliers in a data set.

It will be recognized that some or all of the figures are schematic representations for purposes of illustration only. The figures are provided for the purpose of illustrating one or more implementations with the explicit understanding that they will not be used to limit the scope or the meaning of the claims.

DETAILED DESCRIPTION

The following is merely provided for example purposes with the explicit understanding that the examples described herein will not be used to limit the scope or the meaning of the claims.

I. OVERVIEW

Entities, such as businesses, utilize data in a variety of ways. For example, businesses may collect and integrate business data into business databases and/or data warehouses and report or otherwise utilize the data using business software. In some instances, such business data is utilized by data scientists with predictive algorithms to generate predicted data based on current and/or historical data. Such data scientists, with the assistance of information technology professionals, help organize and use predictive algorithms to generate analytical reports based on the predictions. The data scientists identify a suitable algorithm and the corresponding data stored in a database of a backend system for requested predicted data. A plethora of algorithms exist for a wide variety of predicted data. Thus, such predictive analysis may require an intermediary between the end user and the underlying algorithms and data.

In addition to, or in lieu of, such predictive algorithms usage, the determination of the suitability of the underlying current and/or historical data may be useful to eliminate outliers from the data that might skew or otherwise adversely affect predictions from the predictive algorithms. One algorithm that may be used to eliminate outliers from a data set may be the K-Nearest Neighbor algorithm ("KNN"). The KNN algorithm is a classification algorithm that works on grouping points and/or values of a data set under consideration using the k nearest neighbors based on the Euclidean distance between the point or value and the neighbor, where k determines the number of nearest neighbors to be considered for the calculation.

In some conventional implementations of the KNN algorithm, the outlier detection and elimination finds the average distance of the k nearest neighbors. All the values from the column under consideration may be sorted based on the descending or ascending values of the average distance to the point's or value's nearest neighbors. In some prior implementations, the user is queried for the number and/or percent of outliers to be removed from the data set. Based on the user input the points or values are eliminated from the top of the sorted list until the requested number of outliers have been removed.

Thus, for some conventional implementations of the KNN Algorithm, a parameter specifying the number of outliers that need to be detected in the data set may be required from a user. The algorithm then proceeds to detect the specified number of outliers from the data set based on the maximum average distance of the values with its k nearest neighbors. However, this requirement assumes that the user has some knowledge about the data set prior to running the algorithm, which might not be the case. That is, if the user does not know the number of outliers to be removed from the data set, then the user may use an arbitrary value, which may cause a fewer or a greater number of outliers to be removed than the actual number of outliers in the data set. Instead, this behavior mechanically classifies a certain pre-specified number of data points as outliers. If a data set contains a truly unknown number of outliers, this algorithm cannot detect them on its own. Accordingly, it may be useful to include a method or system that can auto detect the number of outliers for a given data set.

In some conventional implementations, the KNN algorithm calculates the average distance for each data point for a given data set from the k nearest neighbors, and then selects N points that have the least average distances, where N is an input parameter, such as a user-defined input parameter. The steps for detecting the outliers from a data set using a conventional implementation of the KNN algorithm may include: (1) calculating a Euclidean distance of each point or value of a data set from the point's or value's k nearest neighbors; (2) calculating the average of these distances and assigning the average distance to each point or value; (3) sorting the data set based on the average distances; and (4) selecting the top N values of the average distances as the outliers and eliminating the N number of outliers from the data set.

To eliminate the input parameter N, an iterative method of separating the outliers from the data set may be implemented based on average deviation and mean. Accordingly, this method has the advantage of automatically detecting the actual number of outliers in the data set rather than selecting a pre-specified number as outliers. Thus, a user provided value of N, which may be an estimate of the actual number of outliers and may not be dependable, is no longer used.

To determine the number of outliers automatically, the first three steps of the above workflow may remain the same. That is, the initial steps for detecting the outliers from a data set may include: (1) calculating a Euclidean distance of each point or value of a data set from the point's or value's k nearest neighbors; (2) calculating the average of these distances and assigning the average distance to each point or value; and (3) sorting the data set based on the average distances. The remaining part of the algorithm described herein utilizes the list of distances, which may be referred to as list. This list may be sorted in ascending order and the length of this list may be L, which is equal to the number of data points of the list. As will be described in greater detail herein, an iterative process may be applied to the list to automatically detect outliers of the data set.

Generally referring to FIGS. 1-6, the process for automatically detecting outliers for a data set may include: (1) calculating a mean and an average deviation for a list; (2) determining whether the average deviation is equal to zero; (3) if the average deviation is zero, determining if the current iteration is the first iteration; (4) if the average deviation is zero and the current iteration is the first iteration, determining that the list contains all outliers and terminating the process; (5) if the average deviation is zero and the current iteration is not the first iteration, then determining that the list contains no outliers and terminating the process; (6) if the average deviation is not zero, calculating the deviation of a point or value of the list from the mean; (7) selecting any points or values where the calculated deviation of the point or value is greater than the mean and setting the selected points as a second list; (8) determining if the second list contains any points or values based on a length of the list; and either (9) if the second list contains no points or values (e.g., the length of the second list is zero), then determining that the prior list contains all the outliers and terminating the process or (10) if the second list contains any points or values, iterating through steps (1) through (10) until the process terminates.

In some implementations, the process for automatically detecting outliers for a data set may include determining a first subset of data points as potential outliers, determining a second subset using the first subset of data points, and, if the second subset contains no data points, determining that the first subset of data points is the set of outlier data points, or, if the second subset contains data points, determining a third subset using the second subset. In some implementations, the first subset of data points may be determined based on a calculated deviation of each data point being greater than a mean of the data set. In some implementations, the process for automatically detecting outliers may include calculating a mean and an average deviation for the data set. In some implementations, a KNN algorithm may be used to calculate an average distance of each data point of the data set from the each data point's k nearest neighbors and assigning the average distance to each data point. In some further implementations, the process may include determining whether a calculated average deviation of the data set is equal to zero, determining if the current iteration is the first iteration if the average deviation is zero, and determining that the data set contains all outliers if the current iteration is the first iteration or determining that the data set contains no outliers if the current iteration is not the first iteration.

While the foregoing provides a general overview for automatically detecting outliers in a data set via an iterative approach, examples of systems and methods for implementing the foregoing will now be described in greater detail.

II. EXAMPLE SYSTEM

FIG. 1 depicts an example system 100 that may utilize a method for automatically detecting outliers in a data set. The system 100 is a system for providing predictive analysis data to a client device 140, though it should be understood that other systems that may utilize a method for automatically detecting outliers in a data set may be used and the present system 100 is merely an example. The system 100 includes a backend system 110, a predictive analysis system 120, and a client device 140. The predictive analysis system 120 and the client device 140 are in communication via a network 150. The backend system 110 of the present example comprises a server or collection of servers. The server or servers of the backend system 110 may be a computing device, such as computing device 700 of FIG. 7, and/or the server or servers may be configured otherwise. In some instances, the backend system 110 may comprise several computing devices, such as a cloud server, etc. In some implementations, the backend system 110 may include a database from which the underlying data for a predictive algorithm may be retrieved, such as by views that may be part of a database accessing product, such as SAP®'s HANA Analytics Foundation product. The database schema information of the backend database, such as SAP®'s Business Warehouse solution, may be exposed as part of the SAP® HANA Analytics Foundation product to give access to the entire business warehouse database with meaningful names and relations between the tables. In the present example, the backend system 110 may be the HANA platform offered by SAP®.

The predictive analysis system 120 is in communication with the backend system 110 to acquire data from a data store of the backend system 110. In some implementations, the predictive analysis system 120 and the backend system 110 may be part of the same system or may be separate systems. The predictive analysis system 120 includes a predictive analysis server 122 and a predictive analysis data store 130. The predictive analysis server 122 may be a server or several servers. In some instances, the predictive analysis server 122 may comprise several computing devices, such as a cloud server, etc. The predictive analysis server 122 is communicatively coupled to the predictive analysis data store 130 to transmit, store, and/or receive data. The predictive analysis data store 130 may be local to the predictive analysis server 122 or may be remote from the predictive analysis server 122. The predictive analysis data store 130 of the present example may comprise a separate computing device, several computing devices, a tangible computer-readable data storage device, several tangible computer-readable data storage devices, etc. The predictive analysis data store 130 is configured to store data, such as predicted data, and/or other data. In the present example, the predictive analysis data store 130 stores predicted data or values such that a visualization module 144 of the client device 140 can retrieve the predicted data or values to present an end user with appropriate reports/visualizations. Such predicted data or values may be used for business analytics and/or other purposes.

The predictive analysis server 122 includes a data acquisition module 124, an algorithm module 126, and a data writer module 128. The data acquisition module 124 is configured to acquire data from a data store of the backend system 110 that can be used with an algorithm of the algorithm module 126 to present an end user with predicted reports. In the present example, the data acquisition module 124 is configured to determine and retrieve the corresponding data from the backend system 110 based on the algorithm selected by the algorithm module 126.

The algorithm module 126 contains a set of algorithms which may be used for perspective analysis to generate appropriate reports for an end user. The algorithm module 126 may be configured to select corresponding algorithms based on the desired report to be generated. The algorithm module 126 interacts with the data acquisition module 124 to request the corresponding data from the backend system 110. The algorithm module 126 is further configured to utilize the selected algorithm and the corresponding data to generate predicted data or values, such as, for example, sale projection predicted data etc. In some implementations, as will be described in greater detail herein, the corresponding data may be modified to remove outliers from the data set.

The data writer module 128 is configured to receive the predicted data from the algorithm module 126 and to save or otherwise store the predicted values in the predictive analysis data store 130 such that a visualization module 144 of the client device 140 can use the predicted data and present an end user with appropriate reports/visualizations.

Figure 7:
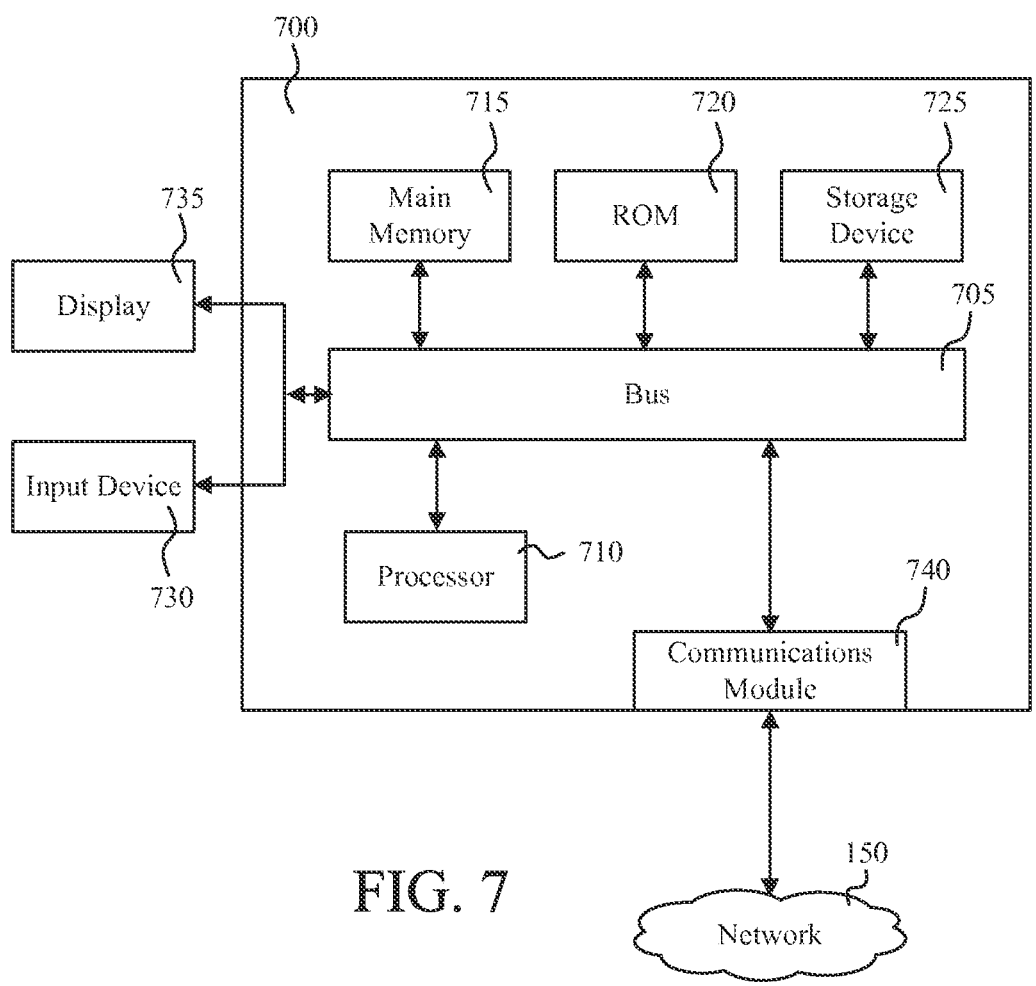
FIG. 7 is a block diagram illustrating an architecture for a computer system that may be employed to implement various elements of the systems and methods.

The predictive analysis system 120 may also include a communications module, such as communications module 740 of FIG. 7, for providing a communication link between the predictive analysis system 120 and the network 150. As such, the communications module enables the predictive analysis system 120 to communicate, wired or wirelessly, with other electronic systems such as client device 140, in communication with the network 150. For instance, the communications module may be coupled to an Ethernet line that connects the predictive analysis system 120 to the Internet or another network 150. In other implementations, the communications module may be coupled to an antenna and provides functionality to transmit and receive information over a wireless communication interface with the network 150.

The client device 140 may be a computing device, such as computing device 700 of FIG. 7. The client device 140 may include a user interface for accessing and/or otherwise interacting with the predictive analysis system 120. For example, the user interface may be provided by a local application, a web application, and/or any other method for allowing a user of the client device 140 to provide input and receive output from the predictive analysis system 120. In one implementation, the user interface may be provided via an application executing on the client device 140. In another implementation, the user interface may be provided via HTML5 or JavaScript on a web browser of the client device 140. Of course other ways of providing a user interface may be implemented as well.

The client device 140 includes a request processing module 142 and a visualization module 144. The request processing module 142 is configured to receive a request for predicted data or values from the end user and send the request to the predictive analysis server 122. The request processing module 142 is further configured to receive the predicted data or values that are generated by the predicted analysis server 122. In some implementations, the request processing module 142 may retrieve the predicted data or values from the predicted analysis data store 130. The visualization module 144 is configured to use the predicted values to create or generate a visualization using the predicted data and displays the visualization on a display of the client device 140 to the end user.

Figure 2:
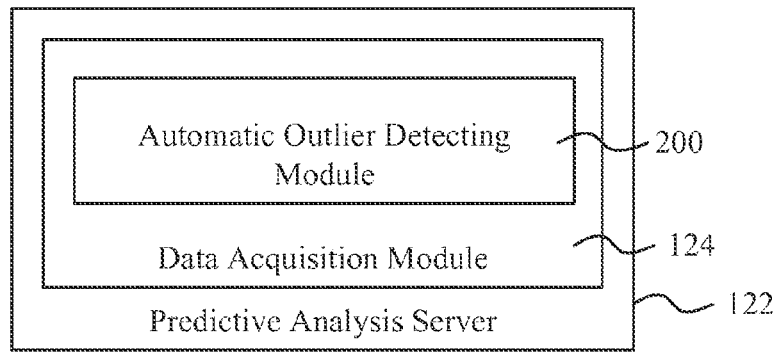
FIG. 2 is a block diagram of an example data acquisition module of the predictive analysis server that includes an automatic outlier detecting module.

FIG. 2 is a block diagram of the predictive analysis server 122 and data acquisition module 124. The data acquisition module 124 includes an automatic outlier detecting module 200. The automatic outlier detecting module 200 is configured to determine outliers in a data set acquired by data acquisition module 124. The outliers determined by automatic outlier detecting module 200 are then removed from the data set such that the outliers may not be stored in the predictive analysis data store 130 and therefore not provided to the client device 140 during a request for predicted data.

The automatic outlier detecting module 200 first calculates a Euclidean distance of each point or value in the data set from the point's or value's k nearest neighbors. The k value may be a predetermined number of other nearest values that is a user-defined number (e.g., the value for k may be received via a user interface). In other implementations, the predetermined number of other nearest values may be determined based, at least in part, on a number of values of the data set. For example, the predetermined number of other nearest values may be a value equal to 5% of the total number of values in the data set. In other implementations, the predetermined number of other nearest values may be a value equal to 10%, 2.5%, 2%, 1%, 0.5%, 0.1%, etc. of the total number of values in the data set. The average of the Euclidean distances are then calculated, and an average distance for each point or value is assigned to the point or value. The data set is then sorted based on the average distances. For example, a list of distances (referred to as list below) may be generated. The list may be sorted in ascending order of distances, with a length (number of data points) equal to L.

The automatic outlier detecting module 200 may then use an iterative approach to identify outliers from the data set based on the list. The automatic outlier detecting module 200 removes the outliers without any user input, e.g., without the user specifying any number of values to remove from the data set. The iterative process of identifying outliers is described in greater detail in the flow chart of the process 300 of FIG. 3.

While the automatic outlier detecting module 200 is shown as part of the data acquisition module 124, in other embodiments; the automatic outlier detecting module 200 may alternatively, or additionally, be included as part of any portion of the predictive analysis system 120 and/or backend system 110. For example, an automatic outlier detecting module may be implemented by the backend system 110 to remove outlier data before sending data to the data acquisition module 124. As another example, the data writer module 128 may include an automatic outlier detecting module for removing outlier data before writing predicted data to the predictive analysis data store 130.

III. EXAMPLE PROCESSES

Figure 3:
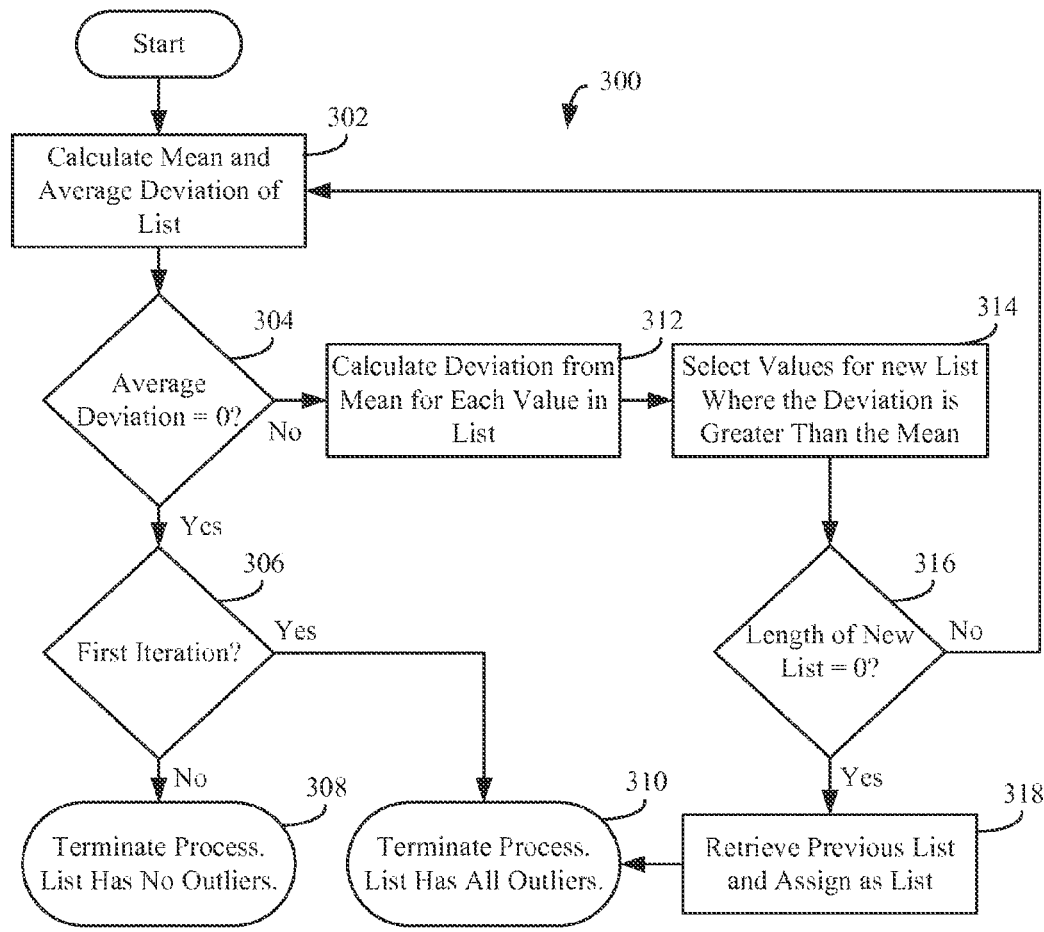
FIG. 3 is a flow diagram for an example iterative approach to automatically detect outliers in a data set.

FIG. 3 is a flow diagram for an example iterative approach to automatically detect outliers in a data set. The process 300 illustrated in FIG. 3 may be executed by, for example, the automatic outlier detecting module 200. The process 300 may receive a list of average distances for data points in the data set calculated by the automatic outlier detecting module 200.

The process 300 includes calculating a mean and average deviation of the list (block 302). Block 302 includes calculating the mean of the distances (e.g., the average distance for all data points) and an average deviation (e.g., a single value representing how much, on average, each data point deviates from the mean). The process 300 then includes determining if the average deviation is equal to zero (block 304). If the average deviation is equal to zero, it means that no value or point in list deviates in value from the other values or points in list. Therefore, there may be no outliers present in list. If the average deviation is not equal to zero, then there may be outliers in the data.

If the average deviation is equal to zero, the process 300 includes determining if list is in its first iteration in the process 300 (block 306). If the average deviation is zero, and list is in its first iteration, then it means that every data point in the data set received by the automatic outlier detecting module 200 may be an outlier. For example, a faulty data set may include the same value. e.g., 0, which may indicate that all the values of list are outliers (or otherwise unusable). The process 300 is terminated (block 310) with the determination that each data point is an outlier. If list is in its second (or later) iteration, then it means that all outlier data points have been removed from the current list. The process 300 is terminated (block 308) with the determination that all points currently in list are not outliers, and that the data points in list are to be used by predictive analysis server.

If the average deviation is not equal to zero in block 304, then outliers may need to be removed from list. The process 300 then includes calculating the deviation of each point or value of the list from the mean (block 312). The process 300 includes selecting points or values for which the calculated deviation of the point or value is greater than the calculated mean (block 314). The selected points or values are used to generate a second list.

The process 300 includes determining if the length of the generated second list is zero (i.e., if no points or values were selected for the second list) (block 316). If not, the process 300 may iteratively repeat. A mean and average deviation of the second list is calculated (block 302), and the process 300 may repeat for the new list. This new, second list contains possible outliers of the data set, while non-outlier data points are not included in the second list. If the length of the second list is zero, then the previous list is retrieved and assigned as a final list (block 318). This previous list contains all outliers in the data set. The process 300 terminates (block 310) with the determination that each data point in the list is an outlier.

The process 300 may iterate until all data points remaining in the list are determined to be outliers, unless if in a first iteration it is determined that there are no outliers. The process 300 continues to drop non-outlier data from each iterative list in which the dropped data is data within a desired deviation of the mean of the list.

Figure 4:
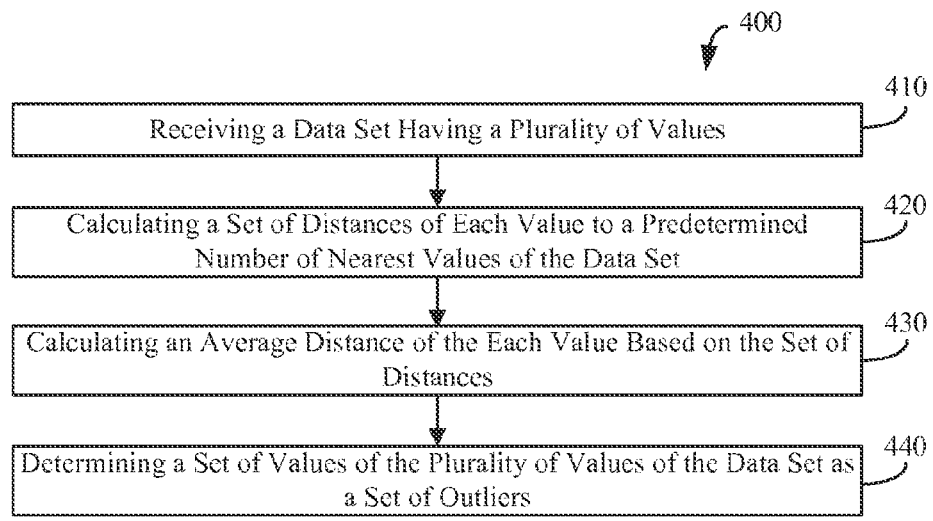
FIG. 4 is a flow diagram of an example process for automatically detecting outliers in a data set.

FIG. 4 is a flow diagram of an example process 400 for automatically detecting outliers in a data set. The process 400 may be generally executed by, for example, an automatic outlier detecting module 200. The process 400 includes receiving a data set having a plurality of values (block 410). The data set may be a data set requested by a predictive analysis server 122 and provided by a backend server 110 as described above. The process 400 further includes calculating a set of distances of each value to a predetermined number of nearest values of the data set (block 420). The distance of each value may be indicative of if the value is an outlier compared to other values. The process 400 further includes calculating an average distance of each value based on the set of distances (block 430). The average distance represents, on average, how much each value deviates from its neighboring values. The process 400 further includes determining a set of values of the plurality of values of the data set as a set of outliers (block 440). In some implementations, display data to indicate the set of outliers may be generated and/or outputted to effect display indicative of the set of outliers. For example, a pop-up window may be generated to indicate the set of outliers. In other implementations the set of outliers may populate a field.

Figure 5:
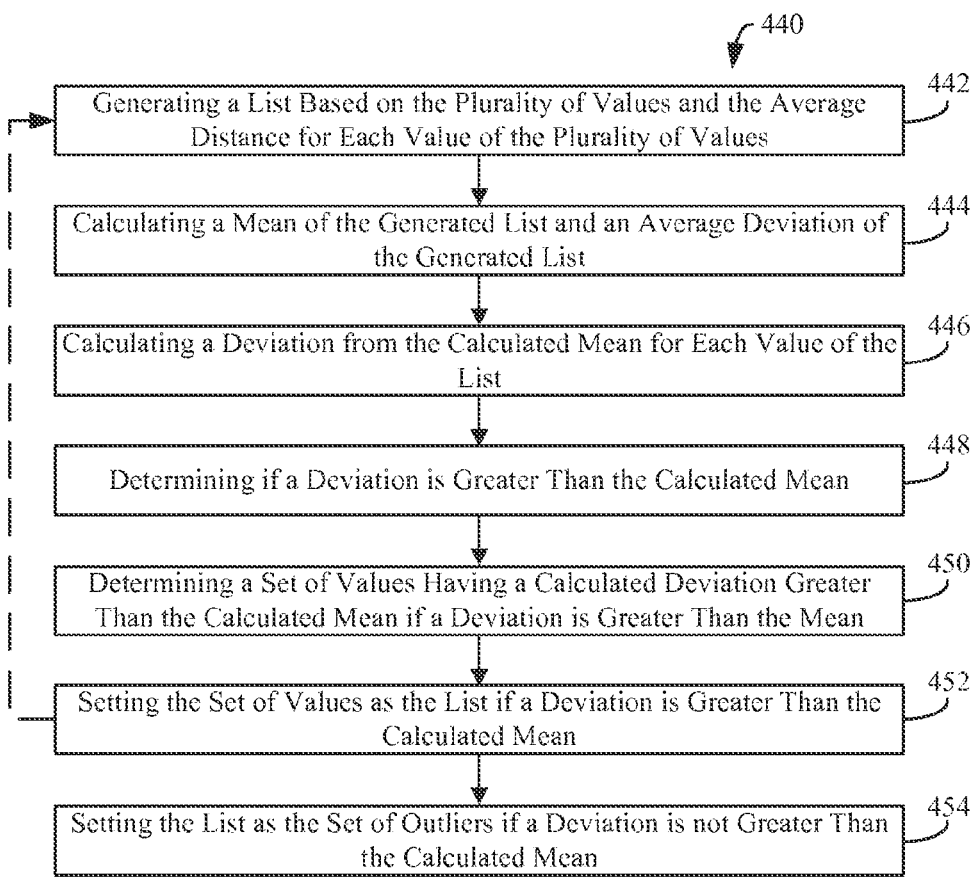
FIG. 5 is a flow diagram of an example sub-process for iteratively automatically detecting outliers in a data set that may be implemented with the process of FIG. 4.

FIG. 5 is a flow diagram of an example sub-process that may be implemented to iteratively automatically detect outliers in a data set that may be implemented with the process of FIG. 4. In the present example, the process may be implemented as part of the determination of a set of values of the plurality of values of the data set as a set of outliers (block 440 of FIG. 4).

The sub-process includes generating a list based on the plurality of values and the average distance for each value of the plurality of values (block 442). The list may be sorted based on the average distances, ascending in order.

The sub-process further includes calculating a mean of the generated list and an average deviation of the generated list (block 444). The mean is the average distance for all data points and the average deviation is a value representing how much, on average, each data point deviates from the mean. The sub-process further includes calculating a deviation from the calculated mean for each value of the list (block 446). The sub-process further includes determining if a deviation for a point is greater than the calculated mean (block 448). The sub-process further includes determining a set of values having a calculated deviation greater than the calculated mean if a deviation is greater than the mean (block 450). The set of values are a set of values that may be outliers. Values not in the set of values determined at block 450 are data values that are determined not to be outliers.

The sub-process further includes setting the set of values as the list, such as a second list, if a deviation is greater than the calculated mean (block 452). If the deviation is greater than the calculated mean, then the list may include outlier data and non-outlier data and the sub-process may repeat at block 442 with the new set of values. If the deviation is not greater than the calculated mean, then each value in the set of values is an outlier and the list is set as the set of outliers for the original data set (block 454).

Figure 6:
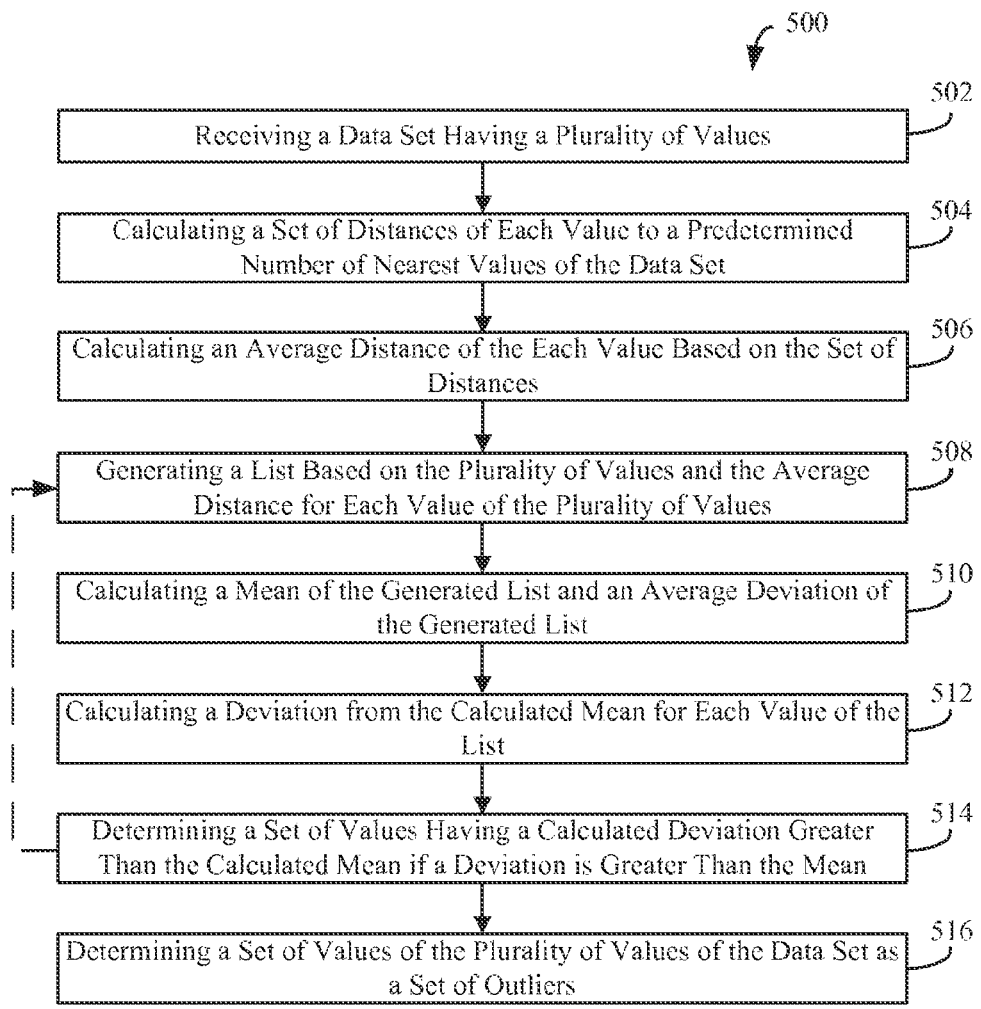
FIG. 6 is a flow diagram of another example process for iteratively automatically detecting outliers in a data set.

FIG. 6 is a flow diagram of another example process 500 for iteratively automatically detecting outliers in a data set. The process 500 may be generally executed by, for example, an automatic outlier detecting module 200. The process 500 includes receiving a data set having a plurality of values (block 502). The data set may be a data set requested by a predictive analysis server 122 and provided by a backend server 110 as described above. The process 500 further includes calculating a set of distances of each value to a predetermined number of nearest values of the data set (block 504). The distance of each value may be indicative of if the value is an outlier compared to other values. The process 500 further includes calculating an average distance of each value based on the set of distances (block 506). The average distance represents, on average, how much each value deviates from its k neighboring values.

The process 500 includes generating a list based on the plurality of values and the average distance for each value of the plurality of values (block 508). The list may be sorted based on the average distances and may be sorted into ascending order. Process 500 further includes calculating a mean of the generated list and an average deviation of the generated list (block 510). The mean is the average distance for all data points and the average deviation is a value representing how much, on average, each data point deviates from the mean. Process 500 further includes calculating a deviation from the calculated mean for each value of the list (block 512). Process 500 further includes determining a set of values having a calculated deviation greater than the calculated mean if a deviation is greater than the mean (block 514). If the deviation for a value of the set of values is greater than the calculated mean, then the value may be an outlier. Values not in the set of values determined at block 514 are data values that are determined not to be outliers. If the deviation is greater than the calculated mean, then the list may include outlier data and non-outlier data, and the process 500 may repeat at block 508 with the new set of values. If no deviations are not greater than the calculated mean, then each value in the set of values is an outlier, and the list is set as the set of outliers for the original data set (block 516). In some implementations, display data to indicate the set of outliers may be generated and/or outputted to effect display indicative of the set of outliers. For example, a pop-up window may be generated to indicate the set of outliers. In other implementations the set of outliers may populate a field.

IV. EXAMPLE APPLICATIONS

The following are examples utilizing the foregoing processes described above on various example data sets. In the first example, a dataset with 50 data points is provided. While applying a KNN algorithm, an average distance is calculated for each point from the point's nearest k neighbors (i.e., as performed in block 430 and block 506) and are sorted according to the average distance. Let k=5 for this example. The sorted list of the 50 data points is as shown below:

|  |  | Data Points | Average distance from 5 neighbors | Devn. |
|---|---|---|---|---|
| Mean | 55.29796 | 59 | 0.8 | 54.49796 |
| avg. devn | 97.4289 | 59 | 0.8 | 54.49796 |
|  |  | 59 | 0.8 | 54.49796 |
|  |  | 45 | 1 | 54.29796 |
|  |  | 45 | 1 | 54.29796 |
|  |  | 44 | 1 | 54.29796 |
|  |  | 61 | 1.2 | 54.09796 |
|  |  | 90 | 1.2 | 54.09796 |
|  |  | 43 | 1.2 | 54.09796 |
|  |  | 90 | 1.2 | 54.09796 |
|  |  | 61 | 1.2 | 54.09796 |
|  |  | 54 | 1.4 | 53.89796 |
|  |  | 54 | 1.4 | 53.89796 |
|  |  | 47 | 1.4 | 53.89796 |
|  |  | 53 | 1.4 | 53.89796 |
|  |  | 47 | 1.4 | 53.89796 |
|  |  | 89 | 1.4 | 53.89796 |
|  |  | 34 | 1.6 | 53.69796 |
|  |  | 27 | 1.6 | 53.69796 |
|  |  | 27 | 1.6 | 53.69796 |

-continued

| Data Points | Average distance from 5 neighbors | Devn. |
|---|---|---|
| 35 | 1.8 | 53.49796 |
| 57 | 1.8 | 53.49796 |
| 51 | 1.8 | 53.49796 |
| 28 | 1.8 | 53.49796 |
| 42 | 1.8 | 53.49796 |
| 32 | 2 | 53.29796 |
| 50 | 2 | 53.29796 |
| 88 | 2 | 53.29796 |
| 31 | 2.2 | 53.09796 |
| 76 | 2.2 | 53.09796 |
| 77 | 2.2 | 53.09796 |
| 36 | 2.4 | 52.89796 |
| 74 | 2.4 | 52.89796 |
| 80 | 2.8 | 52.49796 |
| 72 | 2.8 | 52.49796 |
| 93 | 3 | 52.29796 |
| 64 | 3.2 | 52.09796 |
| 24 | 3.2 | 52.09796 |
| 81 | 3.4 | 51.89796 |
| 69 | 4 | 51.29796 |
| 16 | 4.4 | 50.89796 |
| 18 | 4.8 | 50.49796 |
| 11 | 5.4 | 49.89796 |
| 9 | 6.6 | 48.69796 |
| 99 | 6.8 | 48.49796 |
| 999 | 512.6 | 457.302 |
| 1000 | 512.8 | 457.502 |
| 1755 | 696.6 | 641.302 |
| 2071 | 886.2 | 830.902 |

The example will be described with reference to the process 300 of FIG. 3. Corresponding to block 302 the calculated mean for this dataset is 55.297 and the average deviation is 97.429. Since the average deviation is not equal to zero (block 304), the process 300 proceeds to block 312, and the deviation for each point from the mean is calculated (block 312). This is given in the table above in the third column labeled Devn. Points where the Devn column are greater than the mean of 55.297 are selected (block 314). Such values, i.e., the last four values, are highlighted in bold in the above table. These points may be selected as points for a new list. Since the new list has four points (block 316), the next step is to calculate the mean and average deviation for this new list (block 302). This is an iterative step. The below table gives the new list and new calculated values. The mean is 652.05 and the average deviation is 139.35.

|  |  | Data Points | Average Distance from 5 neighbors | Devn. |
|---|---|---|---|---|
| Mean | 652.05 | 999 | 512.6 | 139.45 |
| avg. devn | 139.35 | 1000 | 512.8 | 139.25 |
|  |  | 1755 | 696.6 | 44.55 |
|  |  | 2071 | 886.2 | 234.15 |

Since the average deviation is not equal to zero (step 304), the process 300 proceeds to block 312, and the deviation for each point from the mean is calculated. This is given in the table above in the third column named Devn. Points where the Devn column are greater than the Mean of 652.05 are selected (block 314). This yields no points since none of the deviations are greater than 652.05. Since the new list is of zero length (no points at all) (block 316), the process 300 terminates with the result that the four points selected in the second iteration are all outliers (block 310). Hence the outliers may be automatically detected as the points: 999, 1000, 1755 and 2071.

Another example application of outlier detection may be in a wildlife census context. In the wild, it is almost impossible to get consolidated information of the animals living in an area and also to find the group and gender of the animal, without the use of sophisticated technology. The usual mechanism used by wildlife experts relying solely on actual enumeration is to make use of the vital signs or impressions left behind by the animals on the move. One such impression that is collected is the measurement of pug marks (i.e., foot or paw print of an animal). The foot prints of tigers differ with the gender and the collected measurements could be clustered to know the presence of both genders of the animal in that area. However it's likely that the readings may have some faulty readings that may not belong to a tiger. This may occur as a result of human error when a pug mark is assumed to be of tiger, but is actually from a different animal of the same or a similar family (e.g., a lion, a puma etc.). Consider a sample set of measurements as shown below:

| Measurement | Pug Mark Sizes in cm. |
|---|---|
| 1 | 118 |
| 2 | 110 |
| 3 | 129 |
| 4 | 120 |
| 5 | 112 |
| 6 | 87 |
| 7 | 109 |
| 8 | 119 |
| 9 | 106 |
| 10 | 120 |
| 11 | 98 |
| 12 | 97 |
| 13 | 99 |
| 14 | 99 |
| 15 | 105 |
| 16 | 99 |
| 17 | 98 |
| 18 | 98 |
| 19 | 99 |
| 20 | 96 |

Suppose that we need to discover whether all these measurements are pug marks of tigers or not. Applying the processes described herein, such as process 300 to the data given in the table, we see that two outliers may be detected, measurement 3 (129 cm.) and measurement 6 (87 cm.).

The advantage that a wildlife expert may gain by using the auto-detection algorithm for outliers is that the wildlife expert does not have to worry about specifying how many outliers to remove. The processes described herein automatically detect the outliers and may in some implementations, inform the user of the outliers (e.g., outputting data to effect display of information indicative of the automatically determined outliers). In the present example, the outliers detected are measurements 3 and 6, which may belong to some other animal than a tiger.

FIG. 7 is a block diagram of a computer system 700 that can be used to implement the client device 140, the predictive analysis server 722, the backend system 110, and/or any other computing device described herein. The computing system 700 includes a bus 705 or other communication component for communicating information and a processor 710 or processing module coupled to the bus 705 for processing information. The computing system 700 also includes main memory 715, such as a RAM or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a ROM 720 or other static storage device coupled to the bus 705 for storing static information and instructions for the processor 710. A storage device 725, such as a solid state device, magnetic disk or optical disk, is coupled to the bus 705 for persistently storing information and instructions. Computing device 700 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 700 may be coupled via the bus 705 to a display 735, such as a Liquid Crystal Display (LCD), Thin-Film-Transistor LCD (TFT), an Organic Light Emitting Diode (OLED) display, LED display. Electronic Paper display, Plasma Display Panel (PDP), and/or other display, etc., for displaying information to a user. An input device 730, such as a keyboard including alphanumeric and other keys may be coupled to the bus 705 for communicating information and command selections to the processor 710. In another implementation, the input device 730 may be integrated with the display 735, such as in a touch screen display. The input device 730 can include a cursor control, such as a mouse, a trackball, or cursor direction keys, for communicating direction information and command selections to the processor 710 and for controlling cursor movement on the display 735.

According to various implementations, the processes and/or methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes and/or method steps described herein. One or more processors in a multi-processing arrangement may also be employed to execute the instructions contained in main memory 715. In alternative implementations, hard-wired circuitry may be used in place of or in combination with software instructions to effect illustrative implementations. Thus, implementations are not limited to any specific combination of hardware circuitry and software.

The computing system 700 also includes a communications module 740 that may be coupled to the bus 705 for providing a communication link between the system 700 and a network 150. As such, the communications module 740 enables the processor 710 to communicate, wired or wirelessly, with other electronic systems coupled to the network 150. For instance, the communications module 740 may be coupled to an Ethernet line that connects the system 700 to the Internet or another network 150. In other implementations, the communications module 740 may be coupled to an antenna (not shown) and provides functionality to transmit and receive information over a wireless communication interface with the network 150.

In various implementations, the communications module 740 may include one or more transceivers configured to perform data communications in accordance with one or more communications protocols such as, but not limited to, WLAN protocols (e.g., IEEE 802.5 a/b/g/n/ac/ad, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communications module 740 may include one or more transceivers configured to communicate using different types of protocols, communication ranges, operating power requirements, RF sub-bands, information types (e.g., voice or data), use scenarios, applications, and/or the like. In various implementations, the communications module 740 may comprise one or more transceivers configured to support communication with local devices using any number or combination of communication standards.

In various implementations, the communications module 740 can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks 150 such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Although an example computing system 700 has been described in FIG. 7 implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a non-transitory tangible medium, firmware, or hardware, including the structures disclosed in this specification and their structural equivalents, or in combinations of one or more of them. The subject matter described in this specification can be implemented as one or more computer programs. i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA) a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for iteratively detecting outliers comprising:
   receiving, at a data processor, a data set having a plurality of values;
   for each value of the plurality of values in the data set:

calculating, using the data processor, a set of Euclidean distances of the each value to a predetermined number of other nearest values of the plurality of values in the data set; and calculating, using the data processor, an average distance of the each value based on the set of Euclidean distances;

generating, using the data processor, a first list based on the plurality of values and the average distance for each value of the plurality of values;

sorting, using the data processor, the generated first list based on the average distance for each value of the plurality of values;

calculating, using the data processor, a first mean of the generated first list and a first average deviation of the generated first list;

calculating, using the data processor, for each value of the first list, a first deviation from the calculated first mean;

determining, using the data processor, a set of values having a calculated first deviation greater than the calculated first mean;

generating, using the data processor, a second list based on the determined set and the average distance for each value of the determined set;

calculating, using the data processor, a second mean of the generated second list and a second average deviation of the generated second list;

calculating, using the data processor, for each value of the generated second list, a second deviation from the calculated second mean; and determining, using the data processor, a set of values of the plurality of values of the data set as a set of outliers based on the second list, the calculated second mean, and the calculated second deviation for each value of the generated second list.

2. The method of claim 1 further comprising:
determining, using the data processor, if a second deviation is greater than the calculated second mean.

3. The method of claim 2 further comprising:
if a second deviation is greater than the calculated second mean:
determining, using the data processor, a second set of values having a calculated second deviation greater than the calculated second mean;
generating, using the data processor, a third list based on the determined second set and the average distance for each value of the determined second set;
calculating, using the data processor, a third mean of the generated third list and a third average deviation of the generated third list; and
calculating, using the data processor, for each value of the generated third list, a third deviation from the calculated third mean.

4. The method of claim 2, wherein, if no second deviation is greater than the calculated second mean, the determination of the set of values of the plurality of values of the data set as the set of outliers comprises setting the generated second list as the set of outliers.

5. The method of claim 1 further comprising:
determining, using the data processor, if the second average deviation is equal to zero.

6. The method of claim 5, wherein, if the second average deviation is equal to zero, the determination of the set of values of the plurality of values of the data set as the set of outliers comprises setting the generated second list as the set of outliers.

7. The method of claim 1, wherein the predetermined number of other nearest values is a user-defined number.

8. The method of claim 1, wherein the predetermined number of other nearest values is determined based, at least in part, on a number of values of the plurality of values of the data set.

9. A system comprising:
one or more data processors; and
a non-transitory computer-readable storage device storing instructions that, when executed by the one or more data processors, cause the one or more data processors to perform operations comprising:
receiving a data set having a plurality of values;
for each value of the plurality of values in the data set:
calculating a set of Euclidean distances of the each value to a predetermined number of other nearest values of the plurality of values in the data set; and
calculating an average distance of the each value based on the set of Euclidean distances; and
determining a set of values of the plurality of values of the data set as a set of outliers, wherein the determination comprises:
generating a list based on the plurality of values and the average distance for each value of the plurality of values,
calculating a mean of the generated list and an average deviation of the generated list,
calculating, for each value of the list, a deviation from the calculated mean,
determining if a deviation is greater than the calculated mean;
if a deviation is greater than the calculated mean:
determining a set of values having a calculated deviation greater than the calculated mean, and
setting the set of values having a calculated deviation greater than the calculated mean as the list, and
if a deviation is not greater than the calculated mean, setting the list as the set of outliers.

10. The system of claim 9, wherein the determination further comprises:
determining if the average deviation is equal to zero.

11. The system of claim 10, wherein, if the average deviation is equal to zero, the determination further comprises:
setting the list as the set of outliers.

12. The system of claim 10, wherein the determination iterates until a deviation is not greater than the calculated mean or an average deviation is equal to zero.

13. The system of claim 9, wherein the predetermined number of other nearest values is a user-defined number.

14. The system of claim 9, wherein the predetermined number of other nearest values is determined based, at least in part, on a number of values of the plurality of values of the data set.

15. A non-transitory computer-readable storage device storing instructions that, when executed by one or more processors, cause the one or more processors to perform operations comprising:
receiving a data set having a plurality of values;
for each value of the plurality of values in the data set:
calculating a set of Euclidean distances of the each value to a predetermined number of other nearest values of the plurality of values in the data set; and
calculating an average distance of the each value based on the set of Euclidean distances;
generating a first list based on the plurality of values and the average distance for each value of the plurality of values;

calculating a first mean of the generated first list and a first average deviation of the generated first list;
determining if the first average deviation is equal to zero;
if the first average deviation is equal to zero, setting the first list as a set of outliers; and
if the first average deviation is not equal to zero,
    calculating, for each value of the first list, a first deviation from the calculated first mean;
    determining if a first deviation is greater than the calculated first mean;
    if a first deviation is greater than the calculated first mean:
        determining a set of values having a calculated first deviation greater than the calculated first mean; and
        generating a second list based on the determined set and the average distance for each value of the determined set; and
    if a first deviation is not greater than the calculated first mean, setting the first list as the set of outliers.

16. The non-transitory computer-readable storage device of claim 15 storing instructions that cause the one or more processors to perform operations further comprising:
sorting the generated first list based on the average distance for each value of the plurality of values in an ascending order.

17. The non-transitory computer-readable storage device of claim 15 storing instructions that cause the one or more processors to perform operations further comprising:
calculating a second mean of the generated second list and a second average deviation of the generated second list;
determining if the second average deviation is equal to zero;
if the second average deviation is equal to zero, setting the second list as the set of outliers; and
if the second average deviation is not equal to zero,
    calculating, for each value of the second list, a second deviation from the calculated second mean;
    determining if a second deviation is greater than the calculated second mean;
    if a second deviation is greater than the calculated second mean:
        determining a second set of values having a calculated second deviation greater than the calculated second mean; and
        generating a third list based on the determined second set and the average distance for each value of the determined second set; and
    if a second deviation is not greater than the calculated second mean, setting the second list as the set of outliers.

18. The non-transitory computer-readable storage device of claim 15, wherein the predetermined number of other nearest values is a user-defined number.

19. The non-transitory computer-readable storage device of claim 15, wherein the predetermined number of other nearest values is determined based, at least in part, on a number of values of the plurality of values of the data set.

20. The non-transitory computer-readable storage device of claim 15 storing instructions that cause the one or more processors to perform operations further comprising:
generating display data to indicate the set of outliers.

* * * * *